Aug. 14, 1962 F. GRIMM-JEANNERAT 3,048,965

WATCH FOR TELEPHONE SETS WITH CALLING DIAL

Filed Nov. 12, 1957

Inventor:
Fritz Grimm-Jeannerat
by: Michael S. Striker
Attorney

United States Patent Office 3,048,965
Patented Aug. 14, 1962

3,048,965
WATCH FOR TELEPHONE SETS WITH CALLING DIAL

Fritz Grimm-Jeannerat, Schmelzistrasse 37, Grenchen, Switzerland

Filed Nov. 12, 1957, Ser. No. 695,934
Claims priority, application Switzerland Nov. 16, 1956
5 Claims. (Cl. 58—46)

Figures 1, 2, 3:
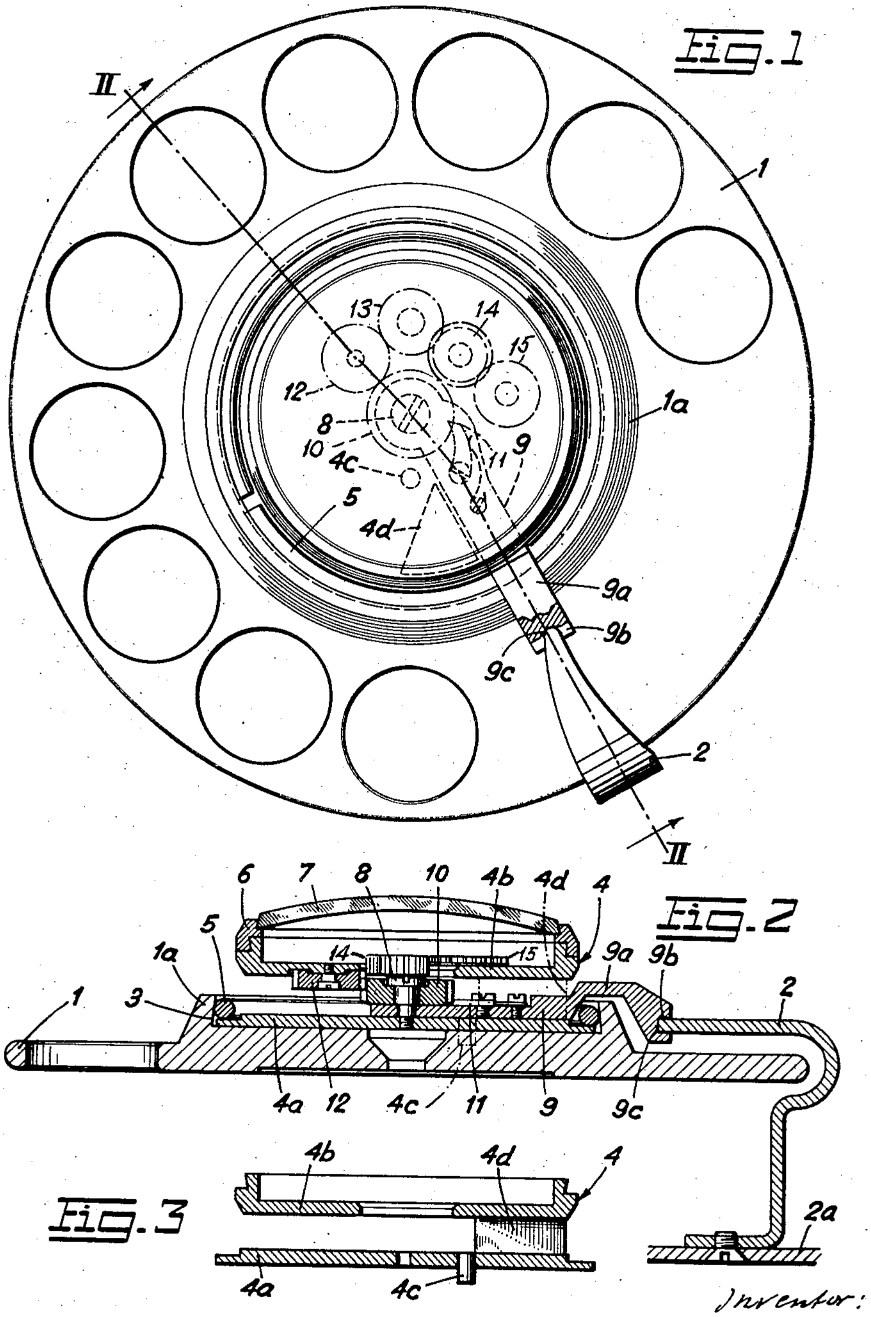

This invention relates to watches for telephone sets with calling dials.

It has already been proposed to mount a watch on the calling dial of a telephone set in such a manner that the rotations of the dial winds up the watch. Fixing means for such a watch have even been proposed so that everybody can mount the watch on said dial, since no modification neither of the calling dial nor of any other part of the telephone set is required.

The watches proposed till now, which are wound up by the rotations of the calling dial, have however serious drawbacks. The form of these watches almost exclusively depends on the telephone set parts which serve to fix the watch to the calling dial. Furthermore, the total height of the watch together with its winding mechanism and its fixing means, measured along the axis of rotation of the calling dial, is so great that the actuation of the calling dial is handicapped. So thick a device on the calling dial of a telephone set does, moreover, not produce an aesthetical effect. Eventually, the fixing and the winding means of these watches are very intricated and consequently delicate and often disturbed so that these watches have never been in vogue.

It is therefore an object of the invention to create a selfwinding watch which can be mounted on the calling dial of a telephone set without requiring any modification thereof.

Another object of the invention is to permit of mounting the watch on the calling dial in a simple and easy way with means independent from the form of the telephone set.

Still another object of the invention is to provide watch fixing and winding means so that the total height of the watch above the calling dial can be kept rather low to produce an aesthetical unit which does not handicap the operation of the calling dial.

It is a further object of the invention to provide a selfwinding watch for telephone set with a sun-wheel, which is connected to the immovable part of the telephone set so as to remain at rest when the calling dial rotates against the action of its return spring, and with a planet-wheel meshing with the sun-wheel and moving with the calling dial, and with gear means to transmit the rotations of that planet-wheel to the barrel arbor of the watch.

Still further objects of the invention will appear in the course of the following description.

One embodiment of the watch according to the invention is represented diagrammatically and by way of example in the accompanying drawings.

In the drawings:

FIG. 1 is a plan view of the watch according to the invention and of the calling dial of a telephone set, whereby the parts unnecessary to the comprehension of the invention have been removed, FIG. 2 is a cross-section along line II—II of FIG. 1, and FIG. 3 is a vertical cross-section of the self-winding mechanism frame which simultaneously serves to fix the watch to the calling dial of the telephone set.

In the embodiment represented 1 designates the calling dial of a telephone set and 2 designates the finger stop of the dial. This finger stop is mounted as usual on an immovable part 2*a* of the telephone set. The dial 1 is provided as usual with an annular rim 1*a* forming a central lodging 3 the side wall of which is slightly conical. Instead of the usual paper and celluloid disks a plate 4*a* of a frame 4 is located in that lodging. This plate 4*a* is fixed to the calling dial 1, angularly, by means of a pin 4*c* engaged in an eccentric bore provided in the bottom of the lodging 4, and, axially, by means of a resilient split ring 4. A cap 4*b* is fixed to the plate 4*a* by means of a triangular tie-stay 4*d* so that the cap extends parallel to the plate 4*a*. The tie-stay 4*d* is located at the periphery of the pieces 4*a* and 4*b* so as to leave a sector-like free space between these pieces having an angle at the center which is at least equal to the greatest angle of rotation of the calling dial 1. The cap 4*b* constitutes the bottom of the watchcase, which comprises moreover a bezel 6 and a glass 7. A usual watch movement, for instance of a calendar-watch, is located in the watchcase 4*b* 6, 7.

An arm 9 is connected to the center of the plate 4*a* by means of a screw 8. This arm 9 extends radially with respect to the calling dial 1, and it is provided with a double bending 9*a* so as to pass over the annular rim 1*a*. A slot 9*b* is provided across the free outer end of this arm 9 so that the free inner end of the finger stop 2 enters said slot. The finger stop 2 and the arm 9 are removably fixed to one another by any appropriate means, for instance by means of a crescent-like notch 9*c* in which the inner end of the finger stop 2 can be set without difficulty because of the elasticity of that stop 2. The notch 9*c* could, however, be dispensed with and the slot 9*b* could then be provided with such sizes that the arm 9 bears against the inner end of the finger stop 2 with enough friction to stay at rest when the calling dial is actuated.

A bearing surface of the screw 8 serves as journalling surface for the sun-wheel 10, which is thus freely mounted coaxially to the dial 1. This sun-wheel is set under the action of a spring-pressed detent 11 pivotally mounted on the arm 9. As is apparent from the drawings, the pawl 11 only permits a counterclockwise rotation of the sun-wheel 10. A planet-wheel 12, freely mounted on the lower face of the cap 4*b*, meshes with the sun-wheel 10. The plane of the lower surface of the planet-wheel 12 is situated above the plane of the upper surface of the arm 9, so that the wheel 12 may freely pass above the arm 9 without stopping the rotation of the calling dial 1. The planet-wheel 12 meshes with an intermediate wheel 13, which is also mounted freely on the lower face of the cap 4*b*. This intermediate wheel 13 meshes with the crown wheel 14 of the watch movement located in the case (4*b*, 6 and 7). The intermediate wheel 13, the crown wheel 14 and the ratchet wheel 15 set on the barrel arbor thus form a gear train which connects the planet-wheel 12 to the barrel arbor for transmitting the rotations of the former to the latter. To ensure the meshing relation between the intermediate wheel and the crown wheel the latter need only be somewhat thicker than usual.

When turning the calling dial 1 clockwise through a certain angle (FIG. 1) to form a call number, the elements carried by this dial turn of course through the same angle with respect to the arm 9, since the latter is kept immobile. The planet-wheel 12 is thus rolling around the sun-wheel 10, which is immobilized by the pawl 11 when the calling dial 1 rotates clockwise. This rolling motion of the planet-wheel 12 is obviously accompanied by a rotation of this planet-wheel about its own axis and this rotation is transmitted to the ratchet wheel 15 set on the barrel arbor by means of the intermediate wheel 13 which thus winds up the mainspring of the watch movement. An overtension of the watch mainspring can be avoided in a manner well known in the art, for instance by means of a brake spring.

When the calling dial 1 comes back towards its original position, under the action of its return-spring, the planet-wheel 12 tends to roll around the sun-wheel 10 and to rotate consequently about its own axis in a direction opposite to the winding direction of the watch mainspring. A retaining pawl (not shown) cooperating with the ratchet wheel prevents however the gears connected to the ratchet wheel from rotating in a direction opposite to the winding direction of the watch mainspring. The planet-wheel 12 cannot thus rotate about its axis, when the calling dial moves under the action of its return-spring; this planet-wheel drives therefore the sun-wheel 10 counterclockwise in FIG. 1. It will be observed that the pawl 11 permits that rotation of the sun-wheel 10. Excepting the entirely negligible action of the pawl 11, which jumps over the teeth of the sun-wheel 10, it will also be observed that the watch elements do not at all bias the movement of the calling dial of the telephone set, when this dial produces the electrical impulses.

The watch winding mechanism controlled by the calling dial of the telephone set does of course not exclude the possibility of providing the watch according to the invention with a manual winding mechanism of a type known in the art. In this case it is not necessary to provide the watch with particular means for suspending the connection between the ratchet wheel set on the barrel arbor and the sun-wheel 10. When the ratchet wheel is driven in the winding direction by the manual winding mechanism, the planet-wheel rotates clockwise about its axis and it drives the sun-wheel 10 counterclockwise, the pawl 11 thereby enabling that rotation.

It follows from the foregoing description that the watch improved in accordance with this invention can be mounted on the calling dial of a telephone set, and that its winding can be ensured by the rotations of this calling dial without requiring any modification of the telephone set and without biasing the movements of the calling dial, when the latter produces the electrical impulses. The step down ratio from the sun-wheel to the ratchet wheel is preferably chosen so that composing the smallest call number already suffices to wind up the watch for a whole day. A watch movement having a long running period (eight days, a month, a.s.o.) can advantageously be used in connection with this invention.

While I have described in detail one embodiment of my invention, it should be understood that various changes in the shape, sizes and arrangement of parts could be resorted to without departing from the spirit or sacrificing the advantages of the invention which is only limited by the subjoined claims.

I claim:

1. A time piece assembly adapted to be mounted on a conventional telephone at a conventional rotary dialing member thereof, said rotary dialing member having a conventional recess for receiving a printed sheet, and the telephone further including a conventional finger stop extending in part over the rotary dialing member, said assembly comprising, in combination, a plate of the same size and configuration of the printed sheet to replace the latter in the recess of the rotary dialing member; a timepiece fixedly carried by said plate and defining with said plate a free space extending between said plate and timepiece across the central portion of said plate; an arm; pivot means which is only a small fraction of the diameter of said plate connecting said arm to said plate for turning movement of said plate with respect to said arm about an axis coinciding with the turning axis of the dialing member when the plate is mounted in the recess thereof, said pivot means and arm being located in said free space; means for connecting said arm with the finger stop to remain stationary with the latter; means carried by said plate for fixing the latter to said rotary dialing member to turn therewith so that the plate and timepiece turn with respect to said arm; and winding means cooperating with said arm and timepiece for participating in the winding of the timepiece during turning of the rotary dialing member, said winding means including a gear located in said free space over said central portion of said plate.

2. A timepiece assembly to be mounted on a telephone dial which includes a conventional manually operable dialing member having a front face formed with a recess for conventionally receiving a printed sheet, and the telephone including a conventional stationary part adjacent the dialing member thereof, said assembly comprising, in combination, a plate of substantially the same size and configuration as the printed sheet to be received in the recess of the dialing member in place of the printed sheet; means cooperating with the plate for fixing the latter to the dialing member to turn therewith; a timepiece fixedly carried by the plate and defining with said plate a free space extending between said plate and timepiece across said central portion of said plate; an arm; pivot means of a diameter which is only a small fraction of the diameter of said plate connecting said arm to the plate for turning movement of said plate with respect to said arm about an axis coinciding with the turning axis of the dialing member when the plate is mounted in the recess thereof, said pivot means and arm being located in said free space; means connected with said arm for fixing the latter to the stationary part of the telephone so that said arm remains stationary while the plate and timepiece turn with the dialing member; and winding means connected to said arm and timepiece for participating in the winding of the latter during turning of the dialing member, said winding means including a gear supported for rotary movement by said pivot means and located in said free space over said central portion of said plate.

3. A timepiece assembly comprising, in combination, a circular plate; an arm; pivot means of a diameter which is only a small fraction of the diameter of said plate connecting said arm to the plate for turning movement of said plate with respect to said arm about an axis perpendicular to and passing through the center of the plate, said arm extending radially beyond the plate and having an outer free end formed with a cutout; a timepiece fixedly carried by said plate and defining with said plate a free space extending between said timepiece and plate across the central portion of said plate; and winding means carried by and operatively connected with said arm and timepiece for participating in the winding of the latter during relative rotation of said plate and timepiece, on the one hand, with respect to said arm on the other hand, said winding means including a gear located in said free space over said central portion of said plate, said plate being adapted to fit into the front recess of a conventional telephone dialing member to be fixed to the latter for rotation therewith and said cutout of said arm being adapted to receive a free end of a conventional finger stop of a telephone so that said arm remains stationary while the plate and timepiece turn with the dialing member, whereby after the plate is fixed in the recess of the dialing member and the finger stop extends into the cutout of said arm, the assembly is ready for use.

4. A timepiece assembly comprising, in combination, a circular plate adapted to fit into a recess in the front face of a telephone dialing member; an elongated arm; pivot means of a diameter which is only a small fraction of the diameter of said plate connecting said arm to said plate for turning movement of said plate with respect to said arm about an axis passing through the center of the plate perpendicularly thereto; a gear located at the side of said arm opposite from said plate and connected to the latter for free turning movement about said axis; means carried by said arm at the side thereof opposite from said plate and cooperating with said gear to limit the latter to one direction of rotation; a block fixed to said plate at the same side thereof as said arm; a timepiece fixedly carried by said block and substantially concentric with said plate so that said timepiece and plate define a free space between themselves at the part of the timepiece which extends beyond the block, said arm extending through said free space and said gear being located in said free space; and gear means carried by said timepiece, located in said free space and including a second gear meshing with said first-mentioned gear so that the latter gear and gear means may participate in the winding of the timepiece during relative rotation between said arm, on the one hand, and said plate, block and timepiece, on the other hand, when said arm is stationary and said plate turns with said dialing member of the telephone, said gear means and timepiece being located on one side of a plane normal to said axis and extending through said space between said timepiece and plate and said means for limiting said gear to one direction of rotation and said arm being located on the other side of said plane so that said gear means and means for limiting said gear to one direction of rotation can pass each other without engaging each other.

5. An assembly as recited in claim 4 and wherein said plate is of substantially the same size and configuration as the central recess at the front face of a telephone dialing member to be received in said recess, means cooperating with said plate for fixing the latter to a telephone dialing member in the recess thereof, means cooperating with said arm for fixing the latter to a stationary part of a telephone so that said arm will remain stationary while said plate and timepiece turn with the dialing member, and said block being small enough to provide unrestrained turning movement of the plate and timepiece with the telephone dialing member through the entire range of angular movement of the latter.

References Cited in the file of this patent

UNITED STATES PATENTS

| | | |
|---|---|---|
| 2,032,414 | Helbein | Mar. 3, 1936 |
| 2,519,917 | Masaniello | Aug. 22, 1950 |
| 2,699,034 | Maire | Jan. 11, 1955 |
| 2,730,860 | Kelbert et al. | Jan. 17, 1956 |
| 2,876,617 | Canning et al. | Mar. 10, 1959 |

FOREIGN PATENTS

| | | |
|---|---|---|
| 95,331 | Switzerland | July 1, 1922 |
| 231,798 | Switzerland | July 17, 1944 |